United States Patent

Matsuyama et al.

[11] Patent Number: 6,097,197
[45] Date of Patent: Aug. 1, 2000

[54] SCANNING PROBE MICROSCOPE

[75] Inventors: Katsuhiro Matsuyama; Nobuaki Sakai, both of Hachioji; Seizo Morita, Osaka; Yasuhiro Sugawara, Mino, all of Japan

[73] Assignee: Olympus Optical Co., Ltd., Tokyo, Japan

[21] Appl. No.: 08/907,191

[22] Filed: Aug. 6, 1997

[30] Foreign Application Priority Data

Aug. 8, 1996 [JP] Japan .................................... 8-209872

[51] Int. Cl.[7] ...................... G01R 31/302; G01R 31/305; G01R 31/02; G03N 23/00
[52] U.S. Cl. .......................... 324/750; 324/751; 324/754; 250/306; 250/307
[58] Field of Search .................................. 324/750, 751, 324/754, 762; 250/306, 307

[56] References Cited

U.S. PATENT DOCUMENTS

| 5,142,147 | 8/1992 | Kawamata et al. | 250/310 |
| 5,376,790 | 12/1994 | Linker et al. | 259/306 |
| 5,902,928 | 5/1999 | Chen et al. | 250/306 |
| 5,939,719 | 8/1999 | Park et al. | 250/306 |

OTHER PUBLICATIONS

T.R. Albrecht et al; "Frequency Modulation Detection Using High–Q Cantilevers for Enhanced Force Microscope Sensitivity"; Jan. 15, 1991; pp. 668–673; J. Appl. Phys. vol. 69, No. 2.

Primary Examiner—Josie Ballato
Assistant Examiner—Jermele M. Hollington
Attorney, Agent, or Firm—Frishauf, Holtz, Goodman, Langer & Chick, P.C.

[57] ABSTRACT

A conductive cantilever having a conductive probe on its free end is supported by a piezoelectric element, which oscillates upon reception of an AC voltage from a first AC voltage supply unit. An AC voltage is applied between a conductive sample and the probe by a variable DC voltage supply unit and a second AC voltage supply unit. An AM demodulator demodulates a signal from a displacement meter at an angular frequency of the first AC voltage supply unit. A lowpass filter extracts a DC component from an output signal from the AM demodulator, and a synchronism detector extracts a component concerning to the angular frequency twice as high as that of the second AC voltage supply unit from the AM demodulator output signal. A Z controller controls a position of a tube scanner based on an output signal from the subtracter which subtracts an output signal of the synchronism detector from an output signal of the lowpass filter. A data processing unit maps configuration data from the Z controller and surface potential data from a voltage control circuit, referring to XY data from an XY scanning circuit, such that a configuration image and a potential distribution image of the sample are obtained.

13 Claims, 4 Drawing Sheets

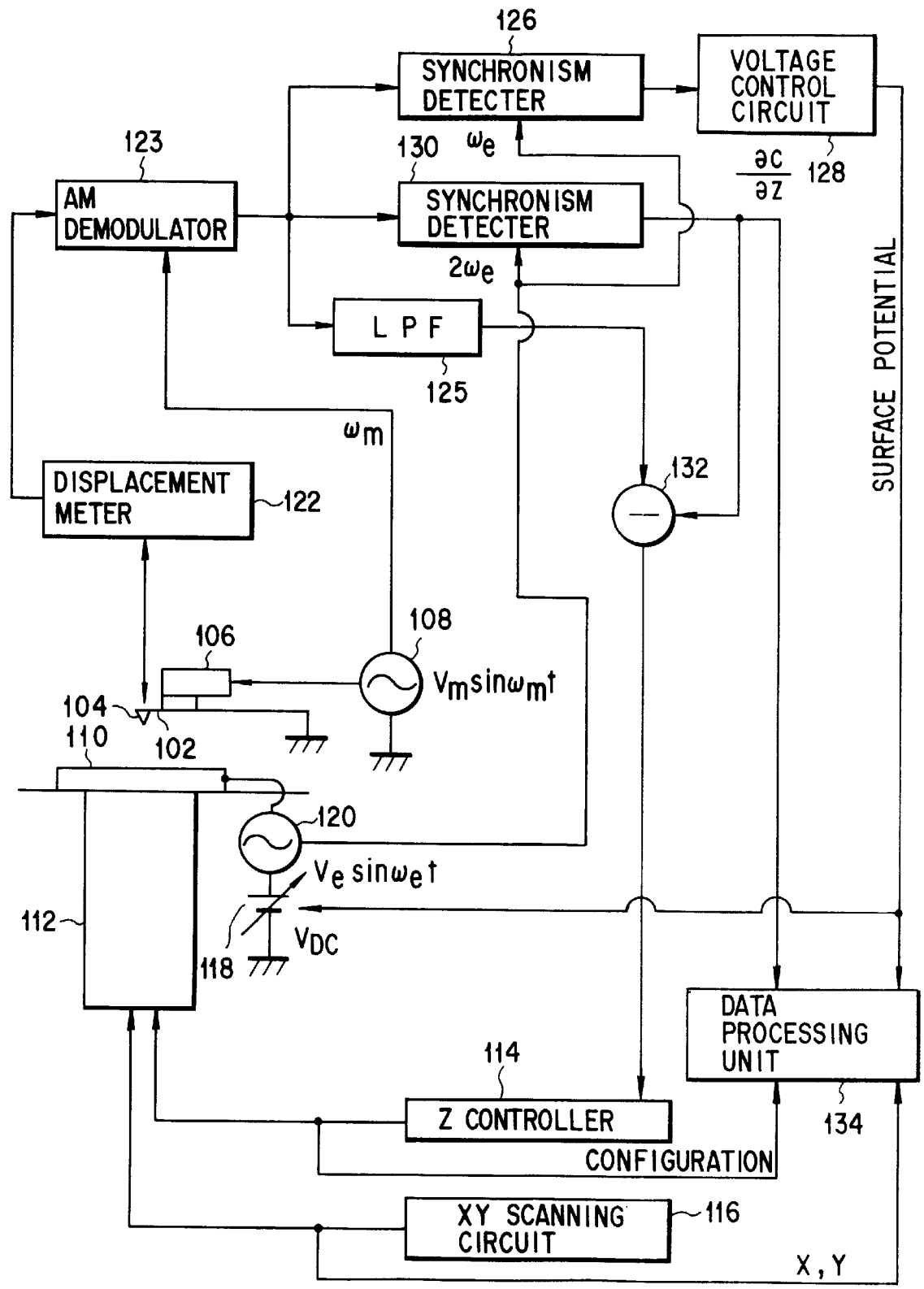
F I G. 1

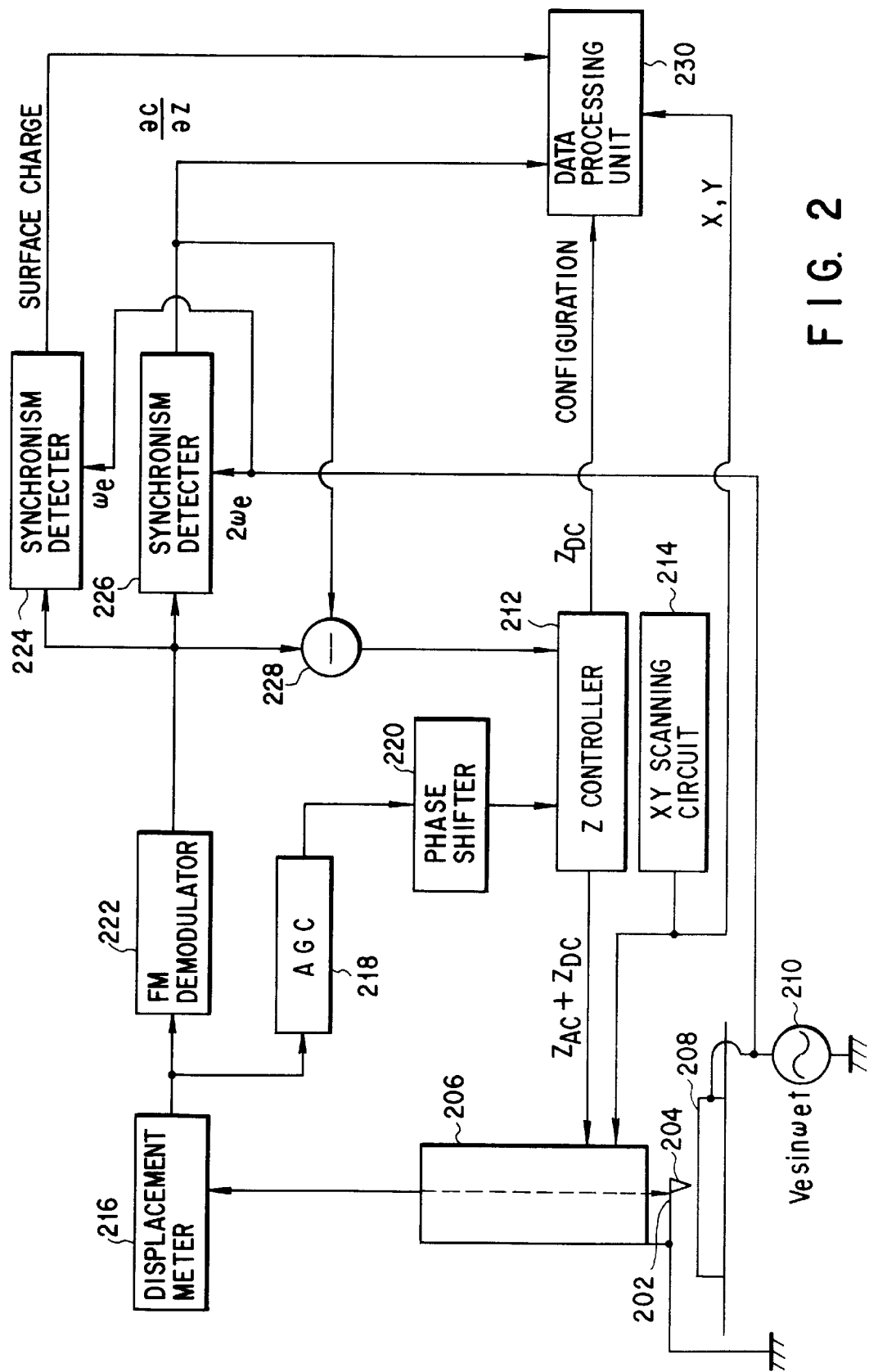
F I G. 2

SCANNING PROBE MICROSCOPE

BACKGROUND OF THE INVENTION

The present invention relates to a scanning probe microscope for examining an electrical characteristic of a sample surface.

A Kelvin probe microscope and a scanning Maxwell microscope are scanning probe microscopes for examining an electrical potential distribution of a sample surface. These microscopes are already commercially available. Both microscopes have an extremely similar structure. First, the structure of the Kelvin probe microscope will be explained. Then, the structure of the scanning Maxwell microscope explained in view of its differences from the Kelvin probe microscope.

The schematic structure of the Kelvin probe microscope is shown in FIG. 3. A cantilever 306 has a probe 308 on its free end. The cantilever 306 is supported by a piezoelectric element 330. The piezoelectric element 330 oscillates upon reception of application of an AC voltage from an AC voltage supply unit 332. Then, the cantilever 306 is oscillated by the oscillation of the piezoelectric element 330. A sample 302 to be examined is mounted on a sample table 304. The sample table 304 is fixed to the free end of a tube scanner 310. A Z controller 312 controls the position of the tube scanner 310 in a Z direction of its free end to maintain a distance between the center of the oscillation of the top end of the probe and a sample surface to be constant. An XY scanning circuit 314 controls the position of the tube scanner 310 in an XY direction of its free end such that the probe is scanned over the sample surface.

The sample 302 is of metal or semiconductor, and the sample table 304 is formed of electrical conductive material. Then, both are electrically connected to each other. Also, the cantilever 306 and the probe 308 are made of conductive material. An AC voltage is applied between the cantilever 306 and the sample table 304 by a variable DC voltage supply unit 316 and an AC voltage supply unit 318. The AC voltage generates an electrical charge distribution changing periodically, in which a polarity to the top end of the probe and a polarity to the sample surface are opposite to each other. The electrical charge distribution generates electrostatic force, which periodically changes. The electrostatic force oscillates the cantilever 306. In other words, the cantilever 306 oscillates upon reception of mechanical force generated by the piezoelectric element 330 and electrical force generated between the probe and the sample.

A displacement meter 320 outputs a signal (displacement signal) showing the displacement of the free end of the cantilever 306. A preamplifier 322 amplifies the displacement signal from the displacement meter 320, and outputs the amplified signal to an AM demodulator 323. The AM demodulator 323 demodulates the output signal from the preamplifier 322 by the angular frequency of the AC voltage supply unit 332. In other words, the AM demodulator 323 extracts a component concerning to the angular frequency equal to that of the AC voltage supply unit 332 from the displacement signal. Then, the AM demodulator 323 outputs the extracted component to a lowpass filter 325 and a synchronism detector 326.

The lowpass filter 325 extracts a DC component contained in the output signal from the AM demodulator 323, and outputs the DC component to the Z controller 312. The Z controller 312 controls the displacement of the tube scanner 310 in its Z direction based on the signal from the lowpass filter 325. The output signal from the Z controller 312 is fetched to a data processing unit 336 as configuration data of the sample surface.

The synchronism detector 326 extracts a component concerning to the angular frequency equal to that of the AC voltage supply unit 318 from the output signal output from the AM demodulator 323. Then, the synchronism detector 326 outputs the extracted component to a voltage control circuit 328. The voltage control circuit 328 controls the voltage value of the variable DC voltage supply unit 316 based on the signal from the synchronism detector 326. The output signal from the voltage control circuit 328 is fetched to the data processing unit 336 as surface potential data of the sample.

The data processing unit 336 maps configuration data, which is output from the Z controller 312, and surface potential data, which is output from the voltage control circuit 328, referring to XY data from the XY scanning circuit 314. Thereby, a configuration image of the sample surface and a potential distribution image can be obtained.

The following will specifically explain the operation of this device.

The cantilever 306 oscillates upon reception of force $F_{osc}$ generated by the oscillation of the piezoelectric element 330, electrostatic force $F_{es}$ acting on the probe 308, and van der Waals force $F_{vdw}$ acting on the probe 308 receives. Force $F_{osc}$ is fixed regardless of the distance between the center of the oscillation of the top end of the probe and the sample surface. Each of $F_{es}$ and $F_{vdw}$ changes by depending on the distance between the center of the oscillation of the top end of the probe and the sample surface. Due to this, the oscillation of the cantilever 306 changes depending on the distance between the center of the oscillation of the top end of the probe and the sample surface.

The Z controller 312 controls the displacement of the tube scanner 310 in its Z direction to maintain the distance between the center of the oscillation of the top end of the probe and the sample surface to be constant. The change of the oscillation of the cantilever 306 is data, which is necessary for the above-mentioned control, and force $f_{osc}$, which has no influence on the above-mentioned control, may be omitted from the consideration. In other words, force F, which the cantilever receives, may be set to $F=F_{es}+F_{vdw}$. The following explanation is based on the assumption of $F=F_{es}+F_{vdw}$.

It is assumed that the voltage of variable DC voltage supply unit 316 is $V_{DC}$, that of AC voltage supply unit 318 is $V_e \sin\omega_e t$, and that of AC voltage supply unit 332 is $V_m \sin\omega_m t$. As compared with resonance frequency $f_0$ of cantilever 306, the angular frequency $\omega_m$ of the voltage of AC voltage supply unit 332 is preferably set to $\omega_m = 2\pi f_0$ to oscillate the cantilever 306 at large amplitude.

Force F, which the cantilever 306 receives, can be expressed by the following equation (1) where a voltage between the probe 308 and sample 302 is set to V.

$$F = \frac{1}{2}\left(\frac{\partial C}{\partial z}\right)V^2 + F_{vdw} \tag{1}$$

In this case, a first term is electrostatic force $F_{es}$. In the voltage V can be expressed by $V=V_S+V_{DC}+V_e \sin\omega_e t$ where a potential of the sample 302 is set to $V_S$. Then, this equation is substituted for the equation (1), and the following equation (2) can be obtained:

$$F = \frac{1}{2}\left(\frac{\partial C}{\partial z}\right)\left\{(V_S + V_{DC})^2 + \frac{V_e^2}{2}\right\} + F_{vdw} + \quad (2)$$

$$\left(\frac{\partial C}{\partial z}\right)(V_S + V_{DC})V_e \sin\omega_e t -$$

$$\frac{1}{4}\left(\frac{\partial C}{\partial z}\right)V_e^2 \cos 2\omega_e t$$

The displacement signal, which is output from the AM demodulator 323, corresponds to the equation (2). The synchronism detector 326 extracts a $\omega_e$ component, that is, a coefficient component of $\sin\omega_e t$ of the equation (2) from the displacement signal, which is output from the AM demodulator 323. The voltage control circuit 328 controls the voltage $V_{DC}$ of variable DC voltage supply unit 316 such that the output signal of the synchronism detector 326 is maintained to be 0, that is, $V_S+V_{DC}=0$. Therefore, the control signal, which is output from the voltage control circuit 328, corresponds to the surface potential of the sample 302 so as to be fetched to the data processing unit 336 as surface potential data.

By the above control, the term containing $V_S+V_{DC}$ disappears from the equation (2). As a result, force F, which the cantilever 306 receives, is expressed by the following equation (3), and the corresponding displacement signal is output from the displacement meter 320.

$$F = \frac{1}{4}\left(\frac{\partial C}{\partial z}\right)V_e^2 + F_{vdw} - \frac{1}{4}\left(\frac{\partial C}{\partial z}\right)V_e^2 \cos 2\omega_e t \quad (3)$$

The lowpass filter 325 extracts DC components, that is, components of first and second terms of the equation (3), from the displacement signal, which is output from the AM demodulator 323. Since the component of the first term is greatly larger than that of the second term, the signal from the lowpass filter 325 is dominantly influenced by the first term. In other words, the signal from the lowpass filter 325 substantially corresponds to the first term without reflecting the influence of the second term.

The Z controller 312 controls the displacement of the tube scanner 310 in its Z direction to maintain the output of the lowpass filter 325 to be constant. As a result, the control signal, which is output from the Z controller 312, corresponds to the configurations of the sample 302 so as to be fetched to the data processing unit 336 as configuration data.

The data processing unit 336 maps configuration data and surface potential data, referring to XY data from the XY scanning circuit 314. Thereby, a configuration image of the sample surface and a potential distribution image can be obtained.

Next, the following will explain the scanning Maxwell microscope. FIG. 4 shows the schematic structure of the scanning Maxwell microscope. The structure of the scanning Maxwell microscope is greatly similar to that of the Kelvin probe microscope, and an input signal source to the Z controller 312, that is, a synchronism detector 334 is slightly different from the structure of Kelvin probe microscope.

The synchronism detector 334 extracts a component of $2\omega_e$, that is, a coefficient component of $\cos 2\omega_e t$ of the equation (3) from the displacement signal, which is output from the AM demodulator 323. The Z controller 312 controls the displacement of the tube scanner 310 in its Z direction so as to maintain the output of the synchronism detector 334 to be constant.

The data processing unit 336 fetches the control signal, which is output from the voltage control circuit 328, as surface potential data. The data processing unit 336 also fetches the control signal, which is output from the Z controller 312, as configuration data. The data processing unit 336 maps configuration data and surface potential data, referring to XY data from the XY scanning circuit 314. Thereby, a configuration image of the sample surface and a potential distribution image can be obtained.

The Kelvin probe microscope obtains configuration data based on substantially the component of the first term of the equation (3). The scanning Maxwell microscope obtains configuration data based on the component of the coefficient of the third term, $\cos 2\omega_e t$ of the equation (3). These components of the first and third terms in the equation (3) are the same, except for the difference in the negative sign of $\cos 2\omega_e t$. In both Kelvin probe microscope and the scanning Maxwell microscope, configuration data can be obtained by maintaining these components to be constant. In other words, configuration data can be obtained by maintaining a capacitance gradient (partial differential by Z of capacitance C) to be constant.

However, the capacitance between the probe and the sample is not always constant by depending on the locations of the sample surface. Due to this, configuration data, which is obtained under control of the constant capacitance gradient, does not correctly reflect the shape of the sample surface.

For example, in the case of the sample in which the equal conductor is exposed onto the surface, capacitance between the probe and the sample equally correspond to the distance between the top end of the probe and the sample surface. However, in the case of the sample having an insulating film on at least a part of the surface, the capacitance between the probe and the sample does not equally correspond to the distance between the top end of the probe and the sample surface. The capacitance changes depending on a thickness of an insulating film (a film thickness is considered to be 0 at a portion having no insulating film). Due to this, the capacitance gradient naturally changes depending on the thickness of the insulating film. Therefore, in the case of the sample having the insulating film on at least a part of the surface, the distance between the top end of the probe and the sample surface is controlled such that the capacitance gradient is maintained to be constant. Under such control, the distance between the top end of the probe and the sample surface is not always maintained to be constant. As a result, configuration data, which is obtained by maintaining the capacitance gradient to be constant, does not correctly reflect the shape of the sample surface.

BRIEF SUMMARY OF THE INVENTION

An object of the present invention is to provide a scanning probe microscope which can examine an electrical characteristic of a sample surface, and which can obtain a correct configuration image of the sample surface.

According to the present invention, there is provided a scanning probe microscope for examining an electrical characteristic of a sample surface, comprising: a conductive probe provided close to the sample surface; a cantilever for supporting the probe on a free end; scanning means for scanning the probe over the sample surface; AC voltage applying means for applying an AC voltage between the probe and the sample surface; displacement detecting means for detecting a displacement of the free end of the cantilever; electrical characteristic data obtaining means for obtaining electrical characteristic data from displacement data of the cantilever obtained by the displacement detecting means; displacement component obtaining means for obtaining a component of the displacement of the cantilever, substantially caused from van der Waals force acting on the probe, from displacement data of the cantilever obtained by the displacement detecting means; control means for controlling a distance between a top end of the probe and the sample surface based on the displacement component obtained by the displacement component obtaining means; and data processing means for mapping electrical characteristic data obtained by the electrical characteristic obtaining means and an output from the control means, referring to position data from the scanning means, thereby obtaining an electrical characteristic distribution image and a configuration image of the sample surface.

More specifically, the AC voltage applying means includes an AC voltage supply unit for generating a sinewave AC voltage, and the displacement component obtaining means has double angular frequency component obtaining means for obtaining a component concerning to the angular frequency twice as high as that of the AC voltage supply unit from displacement data of the cantilever obtained by the displacement detecting means, subtracting means for subtracting double angular frequency component obtained by the double angular frequency component obtaining means from displacement data of the cantilever obtained by the displacement detecting means, and a DC component obtaining means for obtaining a DC component from data obtained by the subtracting means.

The scanning probe microscope is, for example, a device for obtaining a potential distribution image of the sample surface, wherein the AC voltage applying means includes a variable DC voltage supply unit for generating an arbitrary DC voltage, the electrical characteristic data obtaining means includes angular frequency component obtaining means for obtaining a component concerning to the angular frequency equal to that of the AC voltage supply unit from displacement data of the cantilever obtained by the displacement detecting means, and voltage controlling means for controlling the variable DC voltage supply unit based on the angular frequency component data obtained by the angular frequency obtaining means, and the data processing means maps potential data of the sample surface obtained by the voltage controlling means, referring to position data from the scanning means, thereby obtaining a potential distribution image of the sample surface.

The scanning probe microscope is, for example, a device for obtaining an electrical charge distribution image of the sample surface, wherein the electrical characteristic data obtaining means includes angular frequency component obtaining means for obtaining a component concerning to the angular frequency equal to that of the AC voltage supply unit from displacement data of the cantilever obtained by the displacement detecting means, and the data processing means obtains electrical charge data of the sample surface based on angular frequency component data obtained by the angular frequency component obtaining means and double angular frequency component data obtained by the double angular frequency component obtaining means, and maps obtained electrical charge, referring to position data from the scanning means, thereby obtaining an electrical charge distribution image of the sample surface.

Additional objects and advantages of the invention will be set forth in the description which follows, and in part will be obvious from the description, or may be learned by practice of the invention. The objects and advantages of the invention may be realized and obtained particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the structure of a scanning probe microscope of a first embodiment of the present invention;

FIG. 2 shows the structure of a scanning probe microscope of a second embodiment of the present invention;

DETAILED DESCRIPTION OF THE INVENTION

Figure 3:
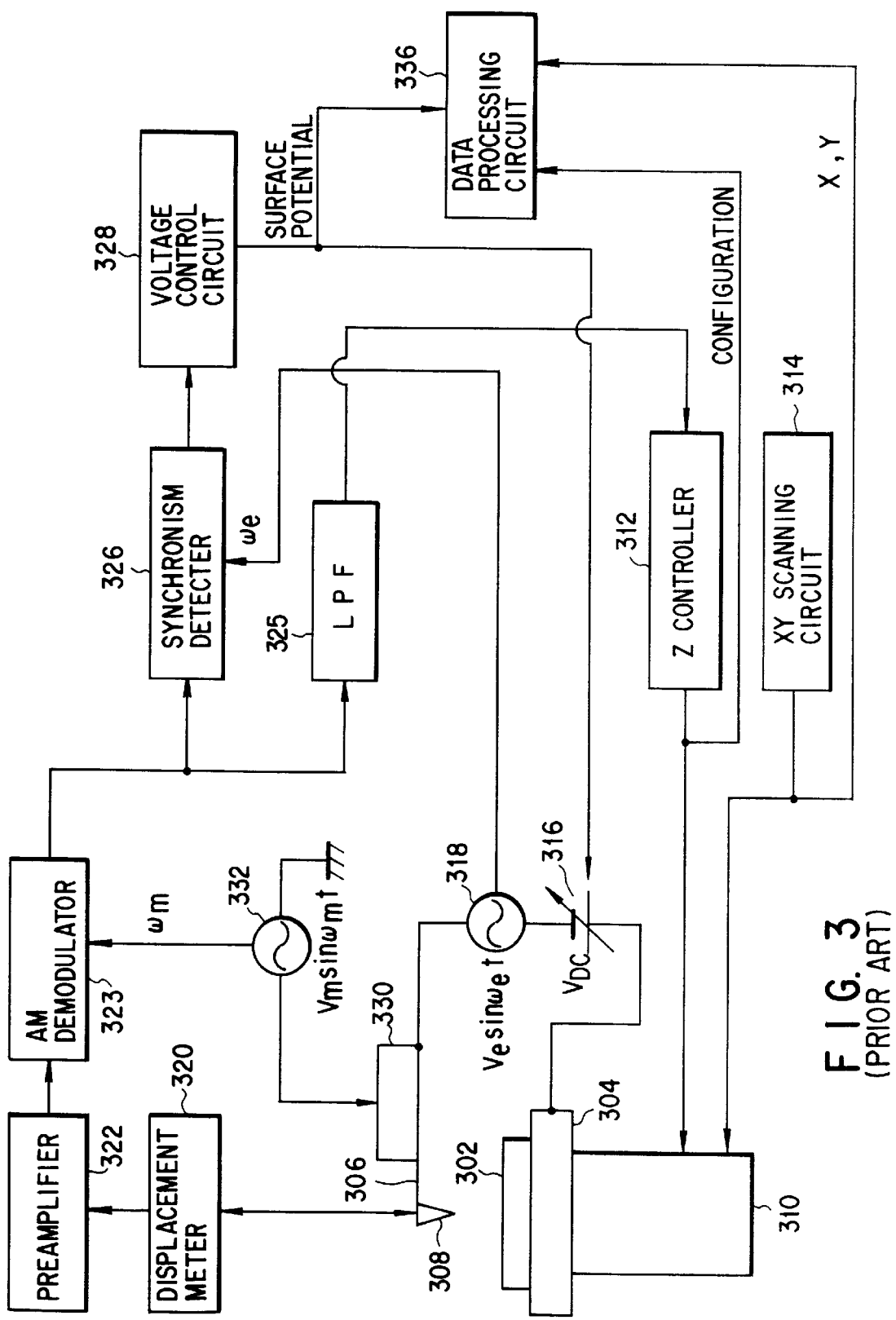
FIG. 3 shows the schematic structure of a Kelvin probe microscope of prior art.
Figure 4:
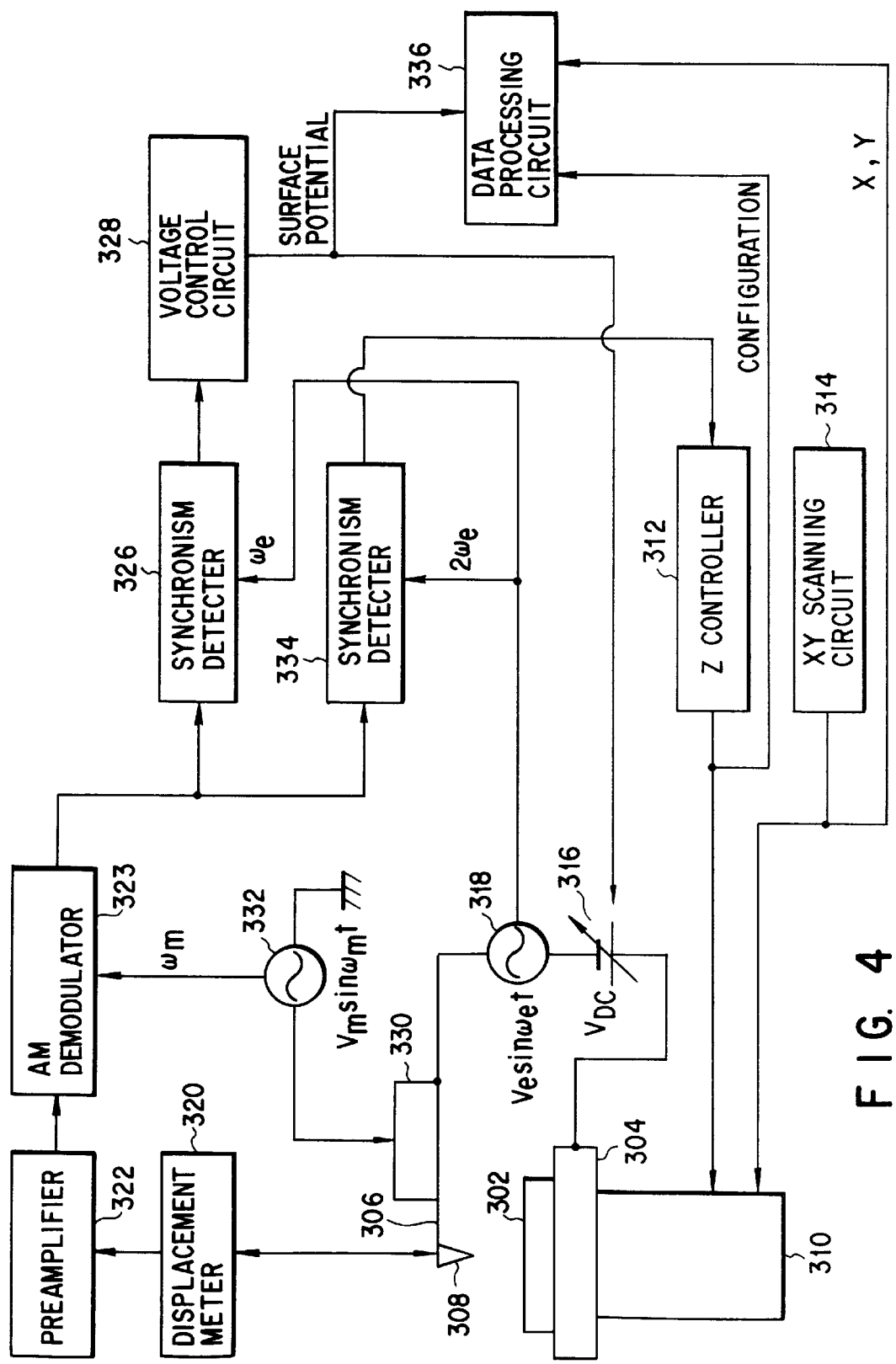
FIG. 4 shows the schematic structure of scanning Maxwell microscope of prior art.

A first embodiment of the present invention will be explained with reference to FIG. 1. FIG. 1 shows the schematic structure of a scanning probe microscope for examining a potential distribution of a sample surface.

A cantilever 102 has a probe 104 on its free end. The cantilever 102 is supported by a piezoelectric element 106. The piezoelectric element 106 oscillates upon reception of an AC voltage from an AC voltage supply unit 108. Then, the cantilever 102 is oscillated by the oscillation of the piezoelectric element 106. A sample 110 to be examined is mounted on the free end of a tube scanner 112. A Z controller 114 controls the position of the tube scanner 112 in a Z direction of its free end to maintain a distance between the center of the oscillation of the top end of the probe and a sample surface to be constant. An XY scanning circuit 116 controls the position of the tube scanner 112 in an XY direction of its free end such that the probe is scanned over the sample surface.

The probe 104 and the cantilever 102 are formed of conductive material, and the cantilever 102 is grounded. The sample 110 is of metal or semiconductor, and an AC voltage is applied thereto by a variable DC voltage supply unit 118 and an AC voltage supply unit 118. The AC voltage generates an electrical charge distribution changing periodically, in which a polarity to the top end of the probe and a polarity to the sample surface are opposite to each other. The electrical charge distribution generates electrostatic force, which periodically changes. The electrostatic force oscillates the cantilever 102. In other words, the cantilever 102 is oscillated by mechanical force generated by the piezoelectric element 106 and electrical force generated between the probe and the sample.

A displacement meter 122 outputs a displacement signal in accordance with the displacement of the free end of the cantilever 102. An AM demodulator 123 demodulates an output signal from the displacement meter 122 by an angular frequency of the AC voltage supply unit 108. In other words, the AM demodulator 123 extracts a component concerning to the angular frequency equal to that of the AC voltage supply unit 108 from the output signal output from the displacement meter 122. Then, the AM demodulator 123 outputs the extracted component to a lowpass filter 125, and synchronism detectors 126 and 130.

The lowpass filter 125 extracts a DC component from the output signal from the AM demodulator 123, and output the component to a subtracter 132.

The synchronism detector 126 extracts a component concerning to the angular frequency equal to that of the AC voltage supply unit 120 from the output signal output from the AM demodulator 123. Then, the synchronism detector 126 outputs the extracted component to a voltage control circuit 128. The voltage control circuit 128 controls the variable DC voltage supply unit 118 based on the output signal from the synchronism detector 126. The control signal from the voltage control circuit 128 is fetched to a data processing unit 134 as surface potential data of the sample.

The synchronism detector 130 extracts a component concerning to the angular frequency twice as high as that of the AC voltage supply unit 120 from the output signal output from the AM demodulator 123. Then, the output signal from the synchronism detector 130 is fetched to the data processing unit 134 as capacitance gradient data.

The subtracter 132 outputs a signal, which is obtained by subtracting the output signal of the synchronism detector 130 from the output signal of the lowpass filter 125. The Z controller 114 controls the position of the tube scanner 112 in a Z direction of its free end based on the output signal from the subtracter 132. The output signal, which is output from the Z controller 114, is fetched to the data processing unit 134 as configuration data of the sample surface.

The data processing unit 134 maps configuration data, which is output from the Z controller 114, and surface potential data, which is output from the voltage control circuit 128, referring to XY data from the XY scanning circuit 314. Thereby, a configuration image of the sample surface and a potential distribution image can be obtained.

The following will specifically explain the operation of this device.

The cantilever 102 oscillates upon reception of force $F_{osc}$ generated by the oscillation of the piezoelectric element 106, electrostatic force $F_{es}$ acting on the probe 104, and van der Waals force $F_{vdw}$ acting on the probe 104. The oscillation of the cantilever 102 changes in accordance with the changes of electrostatic force $F_{es}$ and van der Waals force $F_{vdw}$.

It is assumed that the voltage of the AC voltage supply unit 108 is set to $V_m \sin\omega_m t$, the voltage of the variable DC voltage supply unit 118 is set to $V_{DC}$, and the voltage of the AC voltage supply unit 120 is set to $v_e \sin\omega_e t$.

Force F, which the cantilever 102 receives, can be expressed by the equation (1). In this case, in the voltage V between the probe and the sample can be expressed by $V = V_S + V_{DC} + V_e \sin\omega_e t$ where a potential of the sample 110 is set to $V_S$. Then, this equation is substituted for the equation (1), so that the equation (2) can be obtained.

A displacement signal from the AM demodulator 123 corresponds to the equation (2), and an output signal from the synchronism detector 126 corresponds to the coefficient of $\sin\omega_e t$ of the third term of the equation (2). The voltage control circuit 128 controls the voltage $V_{DC}$ of the variable DC voltage supply unit 118 to maintain $V_S + V_{DC} = 0$ based on the output signal from the synchronism detector 126. Therefore, the control signal from the voltage control circuit 128 corresponds to the surface potential of the sample 110. Then, the control signal is fetched to the data processing unit 134 as surface potential data.

By the above control, the term containing $V_S + V_{DC}$ disappears from the equation (2), and the equation (3) is established. Then, the output signal from the displacement meter 122 corresponds to the equation (3).

The output signal from the synchronism detector 124 corresponds to the DC components of the equation (3), that is, first and second terms. The output signal from the synchronism detector 130 corresponds to the coefficient of $\cos 2\omega_e t$ of the third term. In other words, the third term is the same as the first term. Therefore, the output signal from the subtracter 132 corresponds to the second term of the equation (3). The Z controller 114 controls the displacement of the tube scanner 112 in the Z direction of the tube scanner 112 to maintain the output signal from the subtracter 132 to be constant. In other words, the distance between the center of the oscillation of the top end of the probe and the sample surface is controlled based on van der Waals force $F_{vdw}$.

Therefore, the control signal from the Z controller 114 faithfully reflects the configurations of the sample surface. The control signal is fetched to the data processing unit 134 as configuration data of the sample surface. The data processing unit 134 maps configuration data from the Z controller 114, referring to XY data from the XY scanning circuit 116. Thereby, a configuration image of the sample surface can be obtained.

As mentioned above, the output signal from the synchronism detector 130 corresponds to the coefficient of $\cos 2\omega_e t$ of the third term of the equation (3). Then, the output signal is fetched to the data processing unit 134 as capacitance gradient data. A distance z between the center of the oscillation of the top end of the probe and the sample surface is maintained to be a fixed value, which is predetermined by the control of the Z controller 112. Due to this, the capacitance gradient changes by depending on a thickness d of an insulating film such as an oxide film on the sample surface. As a result, the thickness d of the insulating film existing on the sample can be understood from capacitance gradient data.

As mentioned above, the output signal from the voltage control circuit 128 corresponds to the surface potential of the sample 110, and this is fetched to the data processing unit 134 as surface potential data. The data processing unit 134 maps surface potential data from the voltage control circuit 128, referring to XY data from the XY scanning circuit 116. Thereby, a potential distribution image of the sample surface can be obtained.

Thus, in the scanning probe microscope of the above embodiment, the configuration image of the sample surface and the potential distribution image can be obtained. Also, the thickness of the insulating film such as an oxide film existing on the sample can be obtained.

A second embodiment of the present invention will be explained with reference to FIG. 2. FIG. 2 shows the schematic structure of a scanning probe microscope for examining the potential distribution of the sample surface.

A cantilever 202 has a probe 204 on its free end. The cantilever 202 is attached to the free end of a tube scanner 206. The free end of the tube scanner 206 oscillates upon reception of an AC voltage supplied from a Z controller 212. Then, the free end of the cantilever 202 is oscillated by the oscillation of the tube scanner 206.

The cantilever 202 and the probe 204 are formed of conductive material, and the cantilever 202 is grounded. A sample 208 is of metal or semiconductor, and an AC voltage is applied thereto by an AC voltage supply unit 210. The AC voltage generates an electrical charge distribution changing periodically, in which a polarity to the top end of the probe and a polarity to the sample surface are opposite to each other. The electrical charge distribution generates electrostatic force, which periodically changes. The electrostatic force oscillates the cantilever 202. In other words, the cantilever 202 is oscillated by mechanical force generated by the tube scanner 206 and electric force generated between the probe 204 and the sample 208.

A Z controller 212 controls the position of the tube scanner 206 in a Z direction of its free end to maintain a distance between the center of the oscillation of the top end of the probe and the sample surface to be constant. An XY scanning circuit 214 controls the position of the tube scanner 206 in an XY direction of its free end such that the probe 204 is scanned over the sample surface.

A displacement meter 216 outputs a signal showing the displacement of the free end of the cantilever 102. Amplitude of the output signal from the displacement meter 216 is controlled by an AGC (Automatic Gain Control) circuit 218, and the phase of the output signal is adjusted by a phase shifter 220. Thereafter, the output signal is supplied to the tube scanner 206 through the Z controller 212. The flow of this signal forms a positive feedback loop. The displacement meter 216, AGC circuit 218, and phase shifter 220 constitute an oscillation circuit, which oscillates the cantilever 202 with the Z controller 212 by a resonance frequency $f_0$. AGC circuit 218 controls the output signal from the displacement meter 216 to maintain amplitude of the oscillation of the cantilever 202 to be constant.

The specific structure of the oscillation circuit mentioned above is disclosed in, e.g., T. R. Albrecht, P. Grutter, D. Horne, and D. Ruger, "Frequency modulation detection using high-Q cantilevers for enhanced force microscope sensitivity", J. Appl. Phys., Vol. 69, No. 2, Jan. 15, 1991, which is incorporated herein by reference.

An FM demodulator 222 outputs a signal corresponding to a component depending on the distance between the probe and the sample among force acting on the cantilever 202. A synchronism detector 224 extracts a component concerning to the angular frequency equal to that of the AC voltage supply unit 210 from the output signal output from the FM demodulator 222. The output signal of the synchronism detector 224 is fetched to a data processing unit 230 as surface electrical charge data.

A synchronism detector 226 extracts a component concerning to the angular frequency twice as high as that of the AC voltage supply unit 210 from the output signal output from the FM demodulator 222. Then, the output signal from the synchronism detector 226 is fetched to the data processing unit 230 as capacitance gradient data.

A subtracter 228 outputs a signal obtained by subtracting the output signal of the synchronism detector 226 from the output signal of the FM demodulator 222. The Z controller 212 controls the displacement of the tube scanner 206 in a Z direction based on the output signal from the subtracter 228 such that the distance between the center of the oscillation of the top end of the probe and the sample surface can be maintained to be constant. The output signal from the Z controller 212 includes an AC component $Z_{AC}$ and a DC component $Z_{DC}$. The AC component is used to oscillate the cantilever, and the DC component is used to maintain the distance between the probe and the sample to be constant. The DC component is fetched to the data processing unit 230 as configuration data of the sample surface.

The data processing unit 230 maps configuration data from the Z controller 212, and surface electrical charge data from the synchronism detector 224, referring to XY data from the XY scanning circuit 214. Thereby, a configuration image of the sample surface and an electrical charge distribution image can be obtained. In this case, as a supplementary explanation, surface electrical charge data from the synchronism detector 224 includes not data showing the surface electrical charge itself but capacitance between the probe and the sample, correctly. The data processing unit 230 obtains capacitance based on capacitance gradient data output from the synchronism detector 226. Then, by use of the obtained capacitance, the data processing unit 230 obtains real surface electrical charge data, which shows the surface potential itself, from surface potential data output from the synchronism detector 224.

The following will specifically explain the operation of this device according to this embodiment:

The cantilever 202 oscillates upon reception of force $F_{osc}$ generated by the oscillation of the tub scanner 206, electrostatic force $F_{es}$ acting on the probe 204, and van der Waals force $F_{vdw}$ acting on the probe 204 receives. Force $F_{osc}$ is fixed regardless of the distance between the center of the oscillation of the top end of the probe and the sample surface. Each of $F_{es}$ and $F_{vdw}$ changes depending on the distance between the center of the oscillation of the top end of the probe and the sample surface. Due to this, the oscillation of the cantilever 202 changes depending on the distance between the center of the oscillation of the top end of the probe and the sample surface, that is, the changes of $F_{es}$ and $F_{vdw}$.

The Z controller 212 controls the displacement of the tube scanner 206 in the direction of its free end to maintain the distance between the center of the oscillation of the top end of the probe and the sample surface to be constant. The change of the oscillation of the cantilever 202, is important for the above-mentioned control, and force $f_{osc}$, which has no influence on the above-mentioned control, may be omitted from the consideration. In other words, force F, which the cantilever receives, may be set to $F=F_{es}+F_{vdw}$.

It is assumed that an AC voltage, which is supplied to the tube scanner 206 from the Z controller 212 to oscillate the cantilever 202, is set to $V_m \sin\omega_m t$, that is, the AC component of the control signal, which is output from the Z controller, $Z_{AC}=V_m \sin\omega_m t$.

As compared with resonance frequency $f_0$ of cantilever 202, the angular frequency $\omega_m$ of the AC voltage is preferably set to $\omega_m=2\pi f_0$ to oscillate the cantilever 202 at large amplitude.

It is assumed that an AC voltage, which is supplied to the sample 208 from the AC voltage supply unit 210 is set to $V_e \sin\omega_e t$. The angular frequency $\omega_e$ of the AC voltage is set to be 1/10 of $f_0$ or less such that its frequency $\omega_e/2\pi$ is sufficiently smaller than resonance frequency $f_0$ of the cantilever 202.

It is assumed that the thickness of an insulating film such as an oxide film on the sample surface positioned just below the probe is d, and the surface electrical charge is $Q_s$. It is of course that d=0 at a portion where no insulating film exists and that $Q_s=0$ at a portion where no surface electrical charge exists.

Force F, which the cantilever 202 receives, can be expressed by the following equation (4):

$$F = \frac{1}{2}\left(\frac{\partial C}{\partial z}\right)V^2 + \frac{Q_s Q_t}{4\pi\varepsilon_0 z^2} + F_{vdw} \tag{4}$$

where the distance between the center of the oscillation of the top end of the probe and the sample surface is z, capacitance between the probe and the sample is C, the voltage between the probe and the sample is V, and the electrical charge appearing on the top end of the probe is $Q_t$.

The equations (1) and (4) can be regarded as being substantially equivalent. The equation (1), however, does not include a term corresponding the second term in the equation (4), because the second term in the equation (4) is much less than the first and third terms in the same equation, and can be ignored for measurement of potentials or configurations of the sample surface.

The present embodiment, however, measures the electrical charge at a local area on the sample surface. Thus, the equation (4) has the second term which expresses the very weak force caused by the local electrical charge.

The capacitance C between the probe and the sample can be expressed by the following expression (5):

$$C = \frac{S}{\frac{d}{\varepsilon} + \frac{z}{\varepsilon_0}} \quad (5)$$

where an surface area of the top end of the probe is S.

The electrical charge $Q_t$ appearing on the top end of the probe can be expressed by $Q_t = -Q_s + CV$, and the voltage V can be expressed by $V_e \sin\omega_e t$. If they are substituted for the equation (4), the following equation (6) can obtained:

$$F = \frac{1}{4}\left(\frac{\partial C}{\partial z}\right)V_e^2 - \frac{Q_s^2}{4\pi\varepsilon_0 z^2} + F_{vdw} + \quad (6)$$

$$\frac{CQ_s}{4\pi\varepsilon_0 z^2}V_e \sin\omega_e t -$$

$$\frac{1}{4}\left(\frac{\partial C}{\partial z}\right)V_e^2 \cos 2\omega_e t$$

In the equation (6), the first, second and third terms are DC components. The first term includes capacitance gradient. This does not faithfully reflect the distance between the probe and the sample. However, the third term is the component of van der Waals force, and this faithfully reflects the distance between the probe and the sample. The first term is extremely larger than the second and third terms, and the third term is extremely larger than the second term. Due to this, in the DC components of the equation (6), the first term is dominant, therefore the DC components do not correctly show the distance between the probe and the sample.

The output signal from the FM demodulator 222 corresponds to the equation (6). The output signal from the synchronism detector 224 corresponds to the coefficient of the fourth term, $\sin\omega_e t$, and this is fetched to the data processing unit 230 as surface electrical charge data. Also, the output signal from the synchronism detector 226 corresponds to the coefficient of the fifth term, $\cos 2\omega_e t$, and this is fetched to the data processing unit 230 as capacitance gradient data.

These components of the first and third terms in the equation (6) are the same, except for the difference in the negative sign of $\cos 2\omega_e$. Actually, the output signal from the synchronism detector 226 is the same sign as the first term of the equation (6). Therefore, the output signal from the subtracter 228 corresponds to the following equation (7):

$$F = -\frac{Q_s^2}{4\pi\varepsilon_0 z^2} + F_{vdw} + \quad (7)$$

$$\frac{CQ_s}{4\pi\varepsilon_0 z^2}V_e \sin\omega_e t -$$

$$\frac{1}{4}\left(\frac{\partial C}{\partial z}\right)V_e^2 \cos 2\omega_e t$$

The Z controller 212 removes the component corresponding to the third term of the frequency component and the component corresponding to the fourth term from the signal corresponding to the equation (7) by the lowpass filter. As a result, the DC components corresponding to the first and third terms can be obtained. Then, the Z controller 212 controls the displacement of the tube scanner 206 in its Z direction to maintain the obtained DC components to be constant. In the equation (7), the first term is extremely smaller than the second term. Also, z dependency of the first term is extremely smaller than z dependency of the second term. Therefore, it can be said that the distance between the center of the oscillation of the top end of the probe and the sample surface is substantially controlled based on van der Waals force $F_{vdw}$. Van der Waals force $F_{vdw}$ changes by depending on the distance z between the center of the oscillation of the top end of the probe and the sample surface without being influenced by the variation of capacitance C, that is, regardless of existence of the insulating film on the sample surface.

Therefore, the DC component $Z_{DC}$ of the control signal, which is output from the Z controller 212, faithfully reflects the configurations of the sample surface. The DC component $Z_{DC}$ of the control signal is fetched to the data processing unit 230 as configuration data of the sample surface. The data processing unit 230 maps configuration data from the Z controller 212, that is, the DC component $Z_{DC}$ of the control signal, referring to XY data from the XY scanning circuit 214. Thereby, a configuration image of the sample surface can be obtained.

As mentioned above, the output signal from the synchronism detector 226 corresponds to the coefficient of the fifth term, $\cos 2\omega_e t$, and this is fetched to the data processing unit 230 as capacitance gradient data. The distance z between the center of the oscillation of the probe and the sample surface is maintained to be a predetermined fixed value by the control of the Z controller 212. As result, the capacitance gradient changes by depending on the thickness d of the insulating film such as an oxide film on the sample surface. Therefore, the thickness d of the insulating film on the sample can be understood from capacitance gradient data.

As mentioned above, the output signal from the synchronism detector 224 corresponds to the coefficient of the forth term, $\sin 2\omega_e t$, and this is fetched to the data processing unit 230 as surface electrical charge data. This contains surface electrical charge $Q_s$ and capacitance C. The capacitance C can be obtained from the distance z between the probe and sample and the film thickness d by the equation (5), and this reflects the surface electrical charge $Q_s$. In other words, the data processing unit 230 obtains capacitance based on capacitance gradient data output from the synchronism detector 226. By use of the obtained capacitance, the data processing unit 230 obtains surface electrical charge $Q_s$, which locally exists on the sample surface, based on surface electrical charge data output from the synchronism detector 224. Then, the obtained surface electrical charge $Q_s$ is mapped with reference to XY data output from the XY scanning circuit 214. Thereby, an electrical charge distribution image on the sample surface can be obtained.

Thus, in the scanning probe microscope of the above embodiment, the configuration image of the sample surface and the electrical charge distribution image can be obtained. Also, the thickness of the insulating film such as an oxide film existing on the sample can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A scanning probe microscope for examining an electrical characteristic of a sample surface, comprising:

a conductive probe provided close to the sample surface;

a cantilever, having a free end, for supporting the probe on the free end thereof;

scanning means for scanning the probe over the sample surface;

AC voltage applying means for applying an AC voltage between o the probe and the sample surface;

displacement detecting means for detecting a displacement of the free end of the cantilever and for outputting displacement data;

electrical characteristic data obtaining means for obtaining electrical characteristic data from the displacement data;

displacement component obtaining means for obtaining a displacement component of the cantilever, substantially caused by van der Waals force acting on the probe, from the displacement data;

control means for controlling a distance between a top end of the probe and the sample surface based on said displacement component obtained by said displacement component obtaining means; and data processing means for mapping the electrical characteristic data and an output from said control means, referring to position data output by said scanning means, in order to produce an electrical characteristic distribution image and a configuration image of the sample surface;

wherein:

said AC voltage applying means includes an AC voltage supply unit for generating a sinewave AC voltage, and said displacement component obtaining means comprises double angular frequency component obtaining means for obtaining a double angular frequency component having an angular frequency twice as high as that of the AC voltage supply unit from the displacement data, a DC component obtaining means for obtaining a DC component from the displacement data, and subtracting means for subtracting the double angular frequency component from the DC component.

2. The scanning probe microscope according to claim 1, wherein:

said AC voltage applying means includes a variable DC voltage supply unit for generating an arbitrary DC voltage, said electrical characteristic obtaining means includes angular frequency component obtaining means for obtaining an angular frequency component having an angular frequency equal to that of the AC voltage supply unit from the displacement data, and voltage controlling means for controlling the variable DC voltage supply unit based on the angular frequency component, and said data processing means maps potential data of the sample surface obtained by said voltage controlling means, referring to the position data output by said scanning means, in order to produce a potential distribution image of the sample surface.

3. The scanning probe microscope according to claim 1, wherein:

said electrical characteristic data obtaining means includes angular frequency component obtaining means for obtaining an angular frequency component having an angular frequency equal to that of the AC voltage supply unit from the displacement data, and said data processing means obtains electrical charge data of the sample surface based on the angular frequency component and the double angular frequency component, and maps the electrical charge data, referring to the position data output by said scanning means, in order to produce an electrical charge distribution image of the sample surface.

4. The scanning probe microscope according to claim 1, wherein said displacement detecting means includes exciting means for oscillating the cantilever in a Z direction so as to detect an amplitude of the cantilever in the Z direction.

5. The scanning probe microscope according to claim 4, wherein said control means controls the distance between the top end of the probe and the sample surface based on the DC component.

6. The scanning probe microscope according to claim 5, wherein said displacement detecting means comprises an AM demodulator for outputting a first signal corresponding to a component that changes depending on the distance between the top end of the probe and the sample surface.

7. The scanning probe microscope according to claim 6, wherein:

said exciting means oscillates the cantilever at an arbitrary angular frequency, said AC voltage applying means applies between the probe and the sample an AC voltage having another arbitrary angular frequency different from the angular frequency at which said cantilever is oscillated, said electrical characteristic data obtaining means extracts, from the first signal output from the AM demodulator, surface potential data of the sample based on a second signal which is synchronized with the angular frequency of said AC voltage applying means, and capacitance gradient data of the sample based on a third signal which is synchronized with an angular frequency twice as high as that of said AC voltage applying means, and said control means controls the distance between the top end of the probe and the sample surface based on a fourth signal obtained by subtracting the third signal from a DC component of the first signal output from the AM demodulator.

8. A scanning probe microscope for examining an electrical characteristic of a sample surface, comprising:

a conductive probe provided close to the sample surface;

a cantilever, having a free end, for supporting the probe on the free end thereof;

scanning means for scanning the probe over the sample surface;

AC voltage applying means for applying an AC voltage between the probe and the sample surface;

displacement detecting means for detecting a displacement of the free end of the cantilever and for outputting displacement data;

electrical characteristic data obtaining means for obtaining electrical characteristic data from the displacement data;

displacement component obtaining means for obtaining a displacement component of the cantilever, substantially caused by van der Waals force acting on the probe, from the displacement data;

control means for controlling a distance between a top end of the probe and the sample surface based on said displacement component obtained by said displacement component obtaining means; and data processing means for mapping the electrical characteristic data and an output from said control means, referring to position data output by said scanning means, in order to produce an electrical characteristic distribution image and a configuration image of the sample surface;

wherein:

said AC voltage applying means includes an AC voltage supply unit for generating a sinewave AC voltage, and said displacement component obtaining means comprises a demodulator which outputs a first signal corresponding to a component that changes depending on the distance between the top end of the probe and the sample surface, double angular frequency component obtaining means for obtaining a double angular frequency component having an angular frequency twice as high as that of the AC voltage supply unit from the first signal, and subtracting means for subtracting the double angular frequency component from the first signal.

9. The scanning probe microscope according to claim 8, wherein:

said AC voltage applying means includes a variable DC voltage supply unit for generating an arbitrary voltage, said electrical characteristic obtaining means, which includes said demodulator, comprises angular frequency component obtaining means for obtaining an angular frequency component having an angular frequency equal to that of the AC voltage supply unit from the first signal, and voltage controlling means for controlling the variable DC voltage supply unit based on the angular frequency component, and said data processing means maps potential data of the sample surface obtained by said voltage controlling means, referring to the position data output by said scanning means, in order to produce a potential distribution image of the sample surface.

10. The scanning probe microscope according to claim 8, wherein:

said electrical characteristic data obtaining means includes angular frequency component obtaining means for obtaining an angular frequency component having an angular frequency equal to that of the AC voltage supply unit from the first signal, and said data processing means obtains electrical charge data of the sample surface based on the angular frequency component and the double angular frequency component, and maps the electrical charge data, referring to the position data output by said scanning means, in order to produce an electrical charge distribution image of the sample surface.

11. The scanning prober microscope according to claim 8, wherein said displacement detecting means includes exciting means for oscillating the cantilever in a Z direction so as to detect an amplitude of the cantilever in the Z direction.

12. The scanning probe microscope according to claim 11, wherein said control means extracts a DC component from said displacement component and controls the distance between the top end of the probe and the sample surface based on the DC component.

13. The scanning probe microscope according to claim 11, wherein:

said demodulator comprises an FM demodulator, said AC voltage applying means applies an AC voltage having an arbitrary angular frequency between the probe and the sample, said electrical characteristic data obtaining means extracts, from the first signal output from the FM demodulator, surface charge data of the sample based on a second signal which is synchronized with said arbitrary angular frequency, and capacitance gradient data of the sample based on a third signal which is synchronized with an angular frequency twice as high as said arbitrary angular frequency, and said control means controls the distance between the top end of the probe and the sample surface based on a fourth signal obtained by subtracting the third signal from a DC component of the first signal output from the FM demodulator.

* * * * *

UNITED STATES PATENT AND TRADEMARK OFFICE
CERTIFICATE OF CORRECTION

PATENT NO. : 6,097,197
DATED : August 1, 2000
INVENTOR(S) : Katsuhiro Matsuyama et al.

It is certified that error appears in the above-identified patent and that said Letters Patent is hereby corrected as shown below:

Item [73] Assignee
Insert --, Seizo Morita, Osaka-shi and Yasuhiro Sugawara, Mino-shi--;

Item [56] References Cited,
Under "U.S. PATENT DOCUMENTS",
Insert --5,331,275    7/1994    Ozaki et al....... 324/757
         5,465,046    11/1995   Cambell et al.... 324/751
         5,742,172    4/1998    Yasutaka et al... 324/750
         5,886,532    3/1999    Hsu et al......... 324/635
         5,877,891    3/1999    Park et al......... 250/309--.

Signed and Sealed this

Seventeenth Day of July, 2001

Attest:

NICHOLAS P. GODICI
Attesting Officer    Acting Director of the United States Patent and Trademark Office